United States Patent
Testardi

(10) Patent No.: US 7,148,483 B1
(45) Date of Patent: Dec. 12, 2006

(54) FAST, SIMPLE RADIATION DETECTOR

(76) Inventor: Louis R. Testardi, 1803 Sageway Dr., Tallahassee, FL (US) 32303

( * ) Notice: Subject to any disclaimer, the term of this patent is extended or adjusted under 35 U.S.C. 154(b) by 356 days.

(21) Appl. No.: 10/766,943

(22) Filed: Jan. 30, 2004

(51) Int. Cl.
*G01T 1/20* (2006.01)
(52) U.S. Cl. .................................. 250/361 R
(58) Field of Classification Search ............ 250/361 R
See application file for complete search history.

(56) References Cited

U.S. PATENT DOCUMENTS

| | | | |
|---|---|---|---|
| 4,509,042 A | 4/1985 | Kruse | |
| 5,103,099 A | 4/1992 | Bourdinaud et al. | |
| 5,313,065 A * | 5/1994 | Reed | 250/368 |
| 5,635,717 A * | 6/1997 | Popescu | 250/368 |
| 5,780,856 A | 7/1998 | Oka et al. | |
| 6,198,103 B1 * | 3/2001 | Houillion et al. | 250/357.1 |
| 6,713,765 B1 | 3/2004 | Testardi | |
| 2003/0168602 A1 | 9/2003 | Testardi | |

FOREIGN PATENT DOCUMENTS

JP      09-243752 A      9/1997

OTHER PUBLICATIONS

Rad/Comm Systems Corp. web page describing the RC/3A Portable Radiation Detector (http://www.radcommsystems.com/hand.html).
Ampek web pages describing the GAMMA-RAD and GAMMA-8000 portable scintillation probe (http://www.amptek.com/grad.html, http://www.amptek.com/gamma8k.html, and http://www.amptek.com/dpp.html).
ComTec web pages describing a Low Power Scintillation Probe for (portable) MCA Systems (http://www.fastcomtec.com/fwww/datashee/det/naidet.pdf).
Web document from http://www.arcs.ac.at/G/volltext/ITRAP_Passed_Companies.pdf describing several radiation detecting systems.
Paper IAEA-CN-86/64 from the 2001 International Conference on Measures to Prevent, Intercept and Respond to Illicit Uses of Nuclear Material and Radioactive Sources ("A 'tubeless' portable radiation search tool (PRST) for special nuclear materials").
Paper IAEA-CN-86/63P from the 2001 International Conference on Measures to Prevent, Intercept and Respond to Illicit Uses of Nuclear Material and Radioactive Sources ("Glass fiber sensors for detecting special nuclear materials at portal and monitor stations").
1993 IEEE Nuclear Science Symposium and Medical Imaging Conference Record (vol. 1), pp. 606-608 (High sensitivity, low profile neutron detector for safeguards measurements).

(Continued)

*Primary Examiner*—David Porta
*Assistant Examiner*—Marcus Taningco
(74) *Attorney, Agent, or Firm*—David A. Testardi

(57) ABSTRACT

A radiation detection device, system, and method for use in homeland security is disclosed. The device is portable and includes a photomultiplier tube (PMT) connected to an end of a substantially rigid thin-walled aluminum tube. Inside the aluminum tube, a substantially straight scintillating fiber is disposed (so as to be shielded from ambient light), and an end of the scintillating fiber is optically coupled to the PMT. A voltage output signal from the PMT is signal-processed with a filter to remove high-frequency noise (which may arise from solar radiation spikes) and fed to a voltage-responsive alarm or signalling device. The portable device is employed, for example, in baggage and vehicle radiation scanning systems, as well as for large-area radiation mapping and directional radiation sensing.

39 Claims, 5 Drawing Sheets

OTHER PUBLICATIONS

PNNL-SA-36643 (An overview of non-traditional nuclear threats).

Proceedings of SPIE, v.3536, pp. 148-155 (Performance of a neutron-sensitive scintillating glass-fiber panel for portal, freight, and vehicle monitoring).

Seymour, Richard et al., "Flat-Panel, Scintillating-Fiber Detectors for Safeguards Applications", submitted to INMM Annual Meeting, Jul. 1998, Naples Florida.

Proceedings of SPIE, v.2551, pp. 108-117 (Glass-fiber based neutron detectors for high- and low-flux environments).

Defense Horizons, No. 16, Aug. 2002, pp. 1-12.

NucSafe web pages describing scintillating glass fiber technology and sensors as well as PUMA panels and applications, including The Guardian™ Portable Radiation Search Tool.

Saint-Gobain Scintillation Crystal Arrays and Assemblies brochure (May 2002).

TSWG web page describing NISUS.

Bicron Scintillating Optical Fibers brochure (Saint-Gobain Crystals and Detectors).

Radiation Oncology, Biology, Physics vol. 24, Supplement 1, 1992, p. 288.

U.S. Nuclear Regulatory Commission Report NUREG/CR-5223, Oct. 1988.

License agreement (unpublished).

* cited by examiner

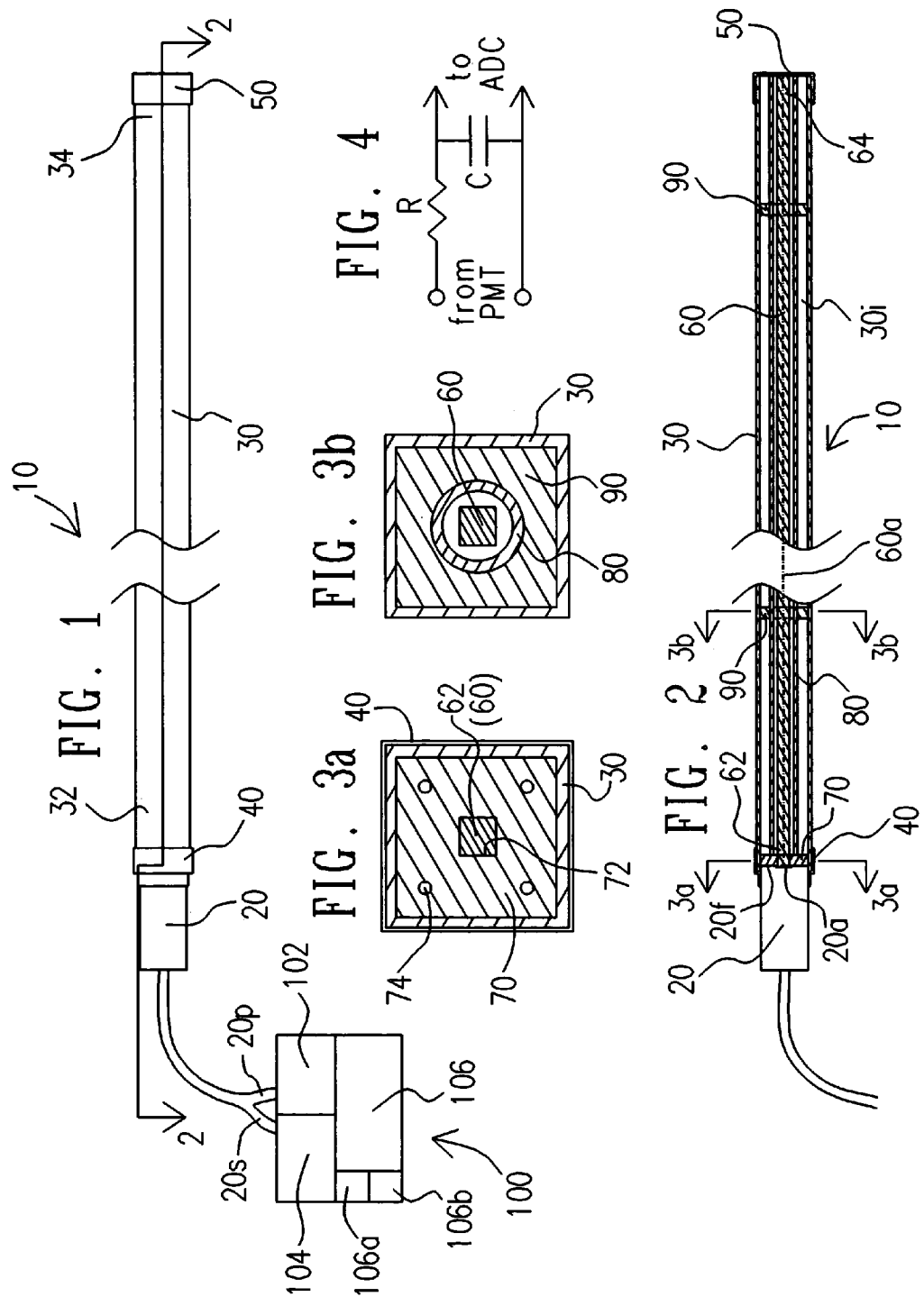

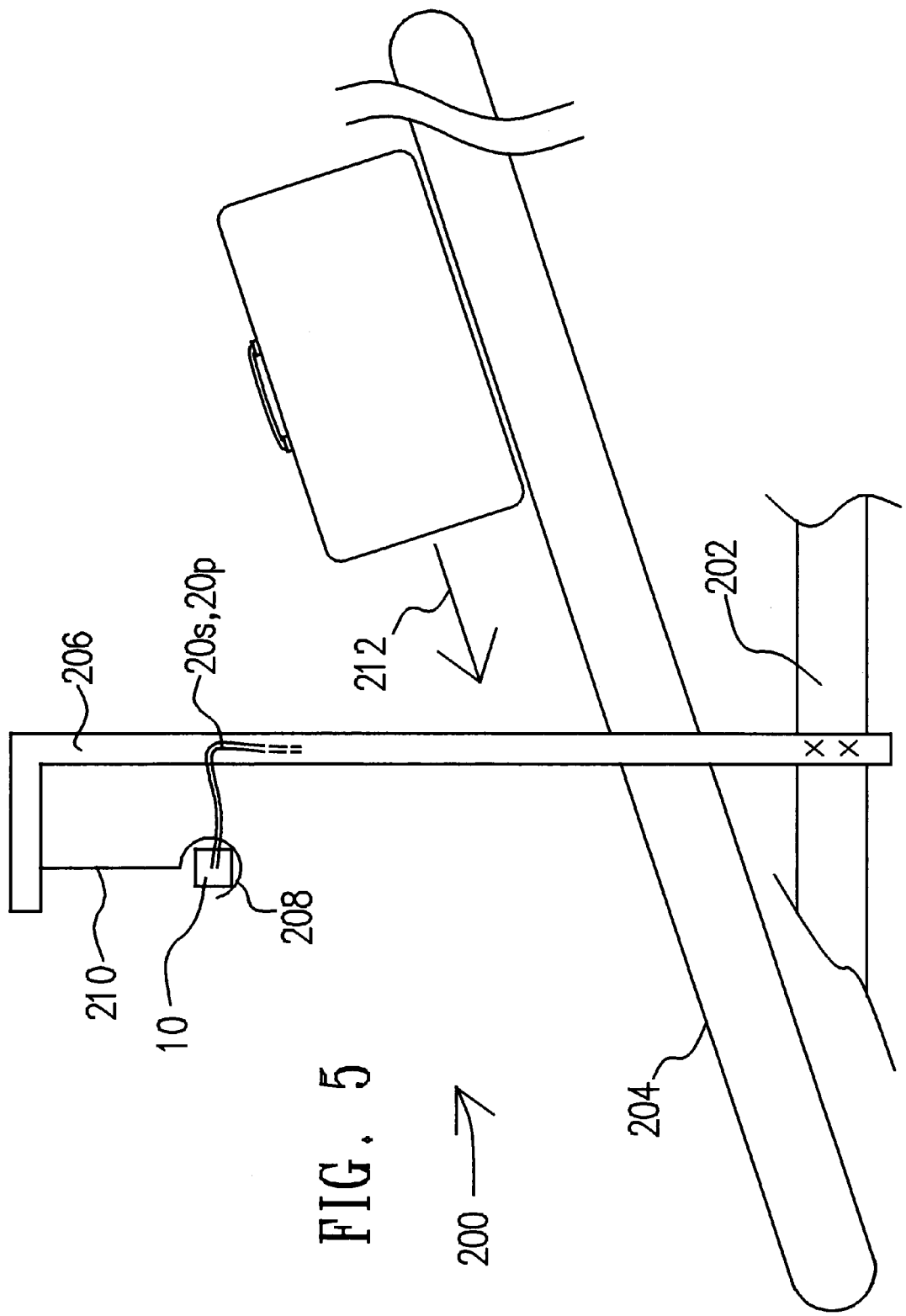

FAST, SIMPLE RADIATION DETECTOR

BACKGROUND OF THE INVENTION

1. Field of the Invention

The present invention pertains to the field of radiation detectors which employ scintillating fibers. More particularly, the present invention pertains to the field of scintillating fiber radiation detectors which are used for homeland security.

2. Description of the Related Art

There is the possibility that radioactive materials, to be used in 'Dirty Bombs', can be sent to the U.S. from a foreign location. This can make them a threat to U.S. homeland security. Likely radio-nuclides for terrorist use include Cesium-137 and Cobalt-60 because of their (respective) penetrating radiation quantum energy (0.7 & 1.3 MeV gamma rays), long radiation half-life (30 & 5 years), and known technology for high activity radiation production (e.g., for medical use).

Shortcomings of current baggage, package, container, and portal radiation detection methods are i) the cost of detection equipment, ii) the cost of added personnel and training, iii) the detection delays for baggage, packages and passengers, iv) the possibility that detection can be cheated, and v) the possibility of travel delays or even travel cancellations due to false-positive radiation detection signals.

In addition, there is the possibility of catastrophic radiation exposure in the U.S. homeland, whether due to terrorism, war, nuclear accidents, or other man-made or natural causes. Such exposure may be latent or patent, and requires fast and accurate detection to provide security to those who might otherwise be affected.

The related art is shown in the following documents, each of which is incorporated by reference herein: Rad/Comm Systems Corp. web page describing the RC/3A Portable Radiation Detector (http://www.radcommsystems.com/hand.html); Amptek web pages describing the GAMMA-RAD and GAMMA-8000 portable scintillation probe (http://www.amptek.com/grad.html, http://www.amptek.com/gamma8k.html, and http://www.amptek.com/dpp.html); ComTec web pages describing a Low Power Scintillation Probe for (portable) MCA Systems (http://www.fastcomtec.com/fwww/datashee/det/naidet.pdf); web document from http://www.arcs.ac.at/G/volltext/ITRAP_Passed_Companies.pdf describing several radiation detecting systems; U.S. Pat. No. 5,780,856 to Oka et al. (Radiation Detector and Method of Detecting Radiation); U.S. Pat. No. 5,103,099 to Bourdinaud et al. (Device for Linear Detection of Radiation); U.S. Pat. No. 4,509,042 (Portal Radiation Monitor); Japanese Published Patent Application 9-243752 (Optical Fiber Type Large Area Radiation Monitor); Papers IAEA-CN-86/64 and IAEA-CN-86/63P from the 2001 International Conference on Measures to Prevent, Intercept and Respond to Illicit Uses of Nuclear Material and Radioactive Sources; 1993 IEEE Nuclear Science Symposium and Medical Imaging Conference Record (vol. 1), pp. 606–608; Greelhood, Bruce, "An Overview of Non-Traditional Nuclear Threats", PNNL-SA-36643; Proceedings of SPIE, v.3536, pp. 148–155; Seymour, Richard et al., "Flat-Panel, Scintillating-Fiber Detectors for Safeguards Applications", submitted to INMM Annual Meeting, July 1998, Naples Fla.; Proceedings of SPIE, v.2551, pp. 108–117; Defense Horizons, Number 16, August 2002, pp. 1–12; NucSafe web pages describing scintillating glass fiber technology and sensors as well as PUMA panels and applications, including The Guardian™ Portable Radiation Search Tool; Saint-Gobain Scintillation Crystal Arrays and Assemblies brochure (05–02); TSWG web page describing NISUS; Bicron Scintillating Optical Fibers brochure (Saint-Gobain Crystals and Detectors); Radiation Oncology, Biology, Physics Volume 24, Supplement 1, 1992, page 288; and U.S. Nuclear Regulatory Commission Report NUREG/CR-5223, October 1988.

Allowed U.S. patent application Ser. No. 10/093,385 and corresponding U.S. Patent Application Publication 2003/0168602, both of which are invented by the instant inventor and incorporated by reference herein, reveal a "Scintillating Fiber Radiation Detector for Medical Therapy" that uses a 5 mm cross-section scintillating fiber and a photomultiplier tube attached to a rigid bed for detecting medical radiation.

SUMMARY OF THE INVENTION

It is one object of the invention to provide a radiation detection system and method which is sensitive and hard to cheat.

It is an additional or alternative object of the invention to provide a radiation detection system and method which allows automatic radiation inspection of baggage and packages without regard to their shape or size.

It is a further additional or alternative object of the invention to provide a radiation detection system and method which is low cost and which utilizes currently available components.

It is a still further additional or alternative object of the invention to provide a radiation detection system and method which avoids false-positive responses.

It is a still further additional or alternative object of the invention to provide a radiation detection system and method which leads to no (or minimal) delay for radiation inspection.

It is a still further additional or alternative object of the invention to provide a radiation detection system and method which can be used to detect radioactive sources which may be illegally transported into or within the country by terrorists.

It is a still further additional or alternative object of the invention to provide a radiation detection system and method which can be used in the detection of life-threatening X-rays and gamma-rays from natural or man-made radio-nuclides.

It is a still further additional or alternative object of the invention to provide a radiation detection system and method which can be used to give an eyes-free, quantitative radiation measure.

In one respect, the invention relates to a radiation detector for homeland security comprising: a substantially rigid structure; a scintillating fiber mounted to the substantially rigid structure, the scintillating fiber having a first end and a second end; the scintillating fiber having a length of between about 8 inches and about 10 feet; a light intensity measuring device mounted to the substantially rigid structure in a substantially relatively immovable manner; coupling means for optically coupling the first end of the scintillating fiber to an active portion of the light intensity measuring device; means for shielding the scintillating fiber from ambient light; wherein the light intensity measuring device produces an output signal in accordance with an amount of light generated by the scintillating fiber; wherein the substantially rigid structure comprises a substantially rigid opaque tube, the scintillating fiber being disposed inside the opaque tube with a longitudinal axis of the scintillating fiber extending in a direction away from the active portion of the light intensity measuring device, and wherein the light intensity measuring device comprises a photomultiplier tube attached to a first end of the substantially rigid opaque tube by a light-proof connection.

In another respect, the invention relates to a radiation detector for homeland security comprising: a substantially rigid tube; a scintillating fiber mounted to the substantially rigid tube, the scintillating fiber having a first end and a second end; the scintillating fiber having a length of between about 8 inches and about 10 feet; a light intensity measuring device mounted to the substantially rigid tube in a substantially relatively immovable manner; coupling means for optically coupling the first end of the scintillating fiber to an active portion of the light intensity measuring device; means for shielding the scintillating fiber from ambient light; wherein the light intensity measuring device produces an output signal in accordance with an amount of light generated by the scintillating fiber; wherein a cross-sectional dimension of the scintillating fiber is approximately 5 mm and a longitudinal axis of the scintillating fiber extends in a direction away from the active portion of the light intensity measuring device; and wherein the output signal from the light intensity measuring device is fed through an integrator circuit, which filters high frequency variations that may be included in the output signal of the light intensity measuring device, and to an analog-to-digital converter for subsequent input to a digital signal processor.

In still another respect, the invention relates to a radiation detector for homeland security comprising: a substantially rigid structure; a scintillating fiber mounted to the substantially rigid structure, the scintillating fiber having a first end and a second end; the scintillating fiber having a length of between about 8 inches and about 10 feet; a light intensity measuring device mounted to the substantially rigid structure in a substantially relatively immovable manner; coupling means for optically coupling the first end of the scintillating fiber to an active portion of the light intensity measuring device; means for shielding the scintillating fiber from ambient light; wherein the light intensity measuring device produces an output signal in accordance with an amount of light generated by the scintillating fiber; wherein the substantially rigid structure comprises a substantially rigid opaque tube, and wherein the scintillating fiber is disposed inside the opaque tube, with a longitudinal axis of the scintillating fiber extending in a direction away from the active portion of the light intensity measuring device; and wherein the output signal from the light intensity measuring device is fed through an integrator circuit, which filters high frequency variations that may be included in the output signal of the light intensity measuring device, and to an analog-to-digital converter for subsequent input to a digital signal processor.

In still a further respect, the invention relates to a radiation detector for homeland security comprising: a substantially rigid structure; a scintillating fiber mounted within the substantially rigid structure, the scintillating fiber having a first end and a second end; the scintillating fiber having a length greater than 8 inches and less than about 10 feet, and a cross-sectional dimension of at least 2.5 mm; a light intensity measuring device mounted to the substantially rigid structure in a substantially relatively immovable manner; coupling means for optically coupling the first end of the scintillating fiber to an active portion of the light intensity measuring device; means for shielding the scintillating fiber from ambient light; wherein the light intensity measuring device produces an output signal in accordance with an amount of light generated by the scintillating fiber; and wherein the output signal from the light intensity measuring device is fed through an integrator circuit, which filters high frequency variations that may be included in the output signal of the light intensity measuring device, and to an analog-to-digital converter for subsequent input to a digital signal processor.

In yet a further respect, the invention relates to a radiation detector for homeland security comprising: a substantially rigid structure; a substantially straight scintillating fiber mounted within the substantially rigid structure, the scintillating fiber having a first end and a second end, an axis, and a cross-sectional dimension of at least 2.5 mm; a light intensity measuring device mounted to the substantially rigid structure in a substantially relatively immovable manner; coupling means for optically coupling the first end of the scintillating fiber to an active portion of the light intensity measuring device; means for shielding the scintillating fiber from ambient light; wherein the light intensity measuring device produces an output signal in accordance with an amount of light generated by the scintillating fiber; and wherein a radiation absorber, made from a radiation shielding material, is mounted on the radiation detector adjacent the second end of the scintillating fiber for modifying a directional anisotropy of the radiation detector, the radiation absorber being aligned with the axis of the scintillating fiber.

In still yet a further respect, the invention relates to a method of detecting dose-rate and direction of radiation for homeland security, comprising the steps of: providing a hand-held, portable scintillating fiber radiation detector with directional anisotropy, the scintillating fiber radiation detector having a substantially straight scintillating fiber which defines a scintillating fiber axis; manipulating the scintillating fiber radiation detector so that the fiber axis is non-aligned to a radiation source; sensing a dose-rate of radiation emanating from the radiation source when the fiber axis is non-aligned to the radiation source; upon sensing a potentially hazardous dose-rate, effecting an alignment process by manipulating the scintillating fiber radiation detector in space until a minimum signal response from the scintillating fiber radiation detector is found; and using a direction of the fiber axis when the minimum signal response from the scintillating fiber radiation detector is found to indicate generally or substantially a direction of the radiation source.

Additional aspects of the invention will become apparent upon a review of the appended claims which are supported by the following description and the accompanying drawing, in which:

BRIEF DESCRIPTION OF THE DRAWINGS

FIG. 1 is a side view of the scintillating fiber radiation detector for homeland security according to a preferred embodiment of the invention;

FIG. 2 is a top sectional view of the scintillating fiber radiation detector for homeland security taken along lines 2—2 of FIG. 1;

FIG. 3a is a sectional view of the scintillating fiber radiation detector for homeland security taken along lines 3a—3a of FIG. 2;

FIG. 3b is a sectional view of the scintillating fiber radiation detector for homeland security taken along lines 3b—3b of FIG. 2;

FIG. 4 is a schematic representation of the circuitry connected to the photomultiplier tube.

FIG. 5 is a side view of a system for scanning moving objects that utilizes the scintillating fiber radiation detector for homeland security shown in FIG. 1;

DETAILED DESCRIPTION OF THE PREFERRED EMBODIMENTS

Figure 2A:
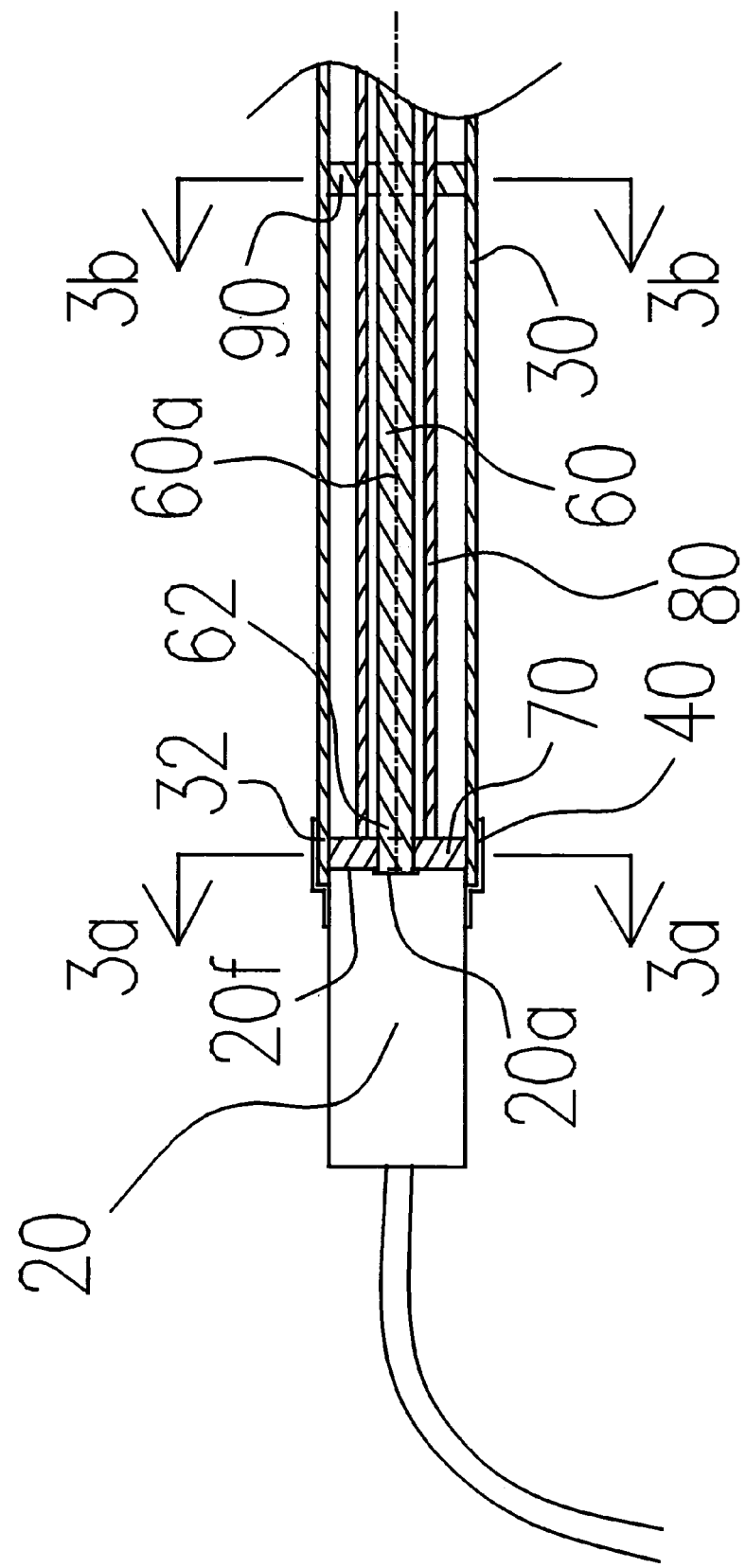
FIG. 2a is an enlargement of the left-hand portion of FIG. 2.

Referring now to the FIGS. wherein like reference characters indicate like elements throughout, there is shown in FIGS. 1, 2, and 2a a scintillating fiber radiation detector for homeland security 10 comprising a photomultiplier tube 20 (PMT; or other light intensity measuring device) mounted or connected to a first end 32 of a rigid (or substantially rigid) structure 30 in a substantially relatively immovable manner by means of a light-proof connection 40. In the preferred embodiment of FIGS. 1, 2, and 2a, the rigid structure 30 is hollow and takes the form of a thin-walled, one-piece, rectangular or square cross-section rigid or substantially rigid aluminum tube. (Accordingly, in the description which follows, the rigid structure 30 will be referred to as tube 30.) A second end 34 of the rigid tube 30 is covered by a light-proof cover or cap 50. The presence of the photomultiplier tube 20 and the light-proof connection 40 at the first end 32 of the tube 30 combined with the presence of the light-proof cover 50 at the second end of the tube 30 creates an internal space 30i within the tube 30 that is closed off (i.e. shielded) from ambient light.

More particularly, the PMT 20 comprises a small, portable, battery-powered photomultiplier tube having a length of approximately 60 mm and a casing shaped like a rectangular parallelepiped. Such a PMT is made, for example, by Hamamatsu Photonics (Japan). The PMT is sized so that its front face can be inserted slightly into (or urged substantially flush against) the opening at the first end 32 of the rigid tube 30 when the PMT 20 and rigid tube 30 are assembled together.

The rigid tube 30 is, in the preferred embodiment, approximately six feet long (or about 2 m), although shorter or longer lengths, such as between approximately 8 inches (203.2 mm) and approximately 10 feet, or between approximately 3 feet and approximately 10 feet or more, can be used for many applications and other embodiments. The tube 30 is rigid or substantially rigid and opaque and has a 1" square cross-section and a 1/16" wall thickness. (The tube 30 is preferably formed as one piece by e.g. extrusion, drawing, machining or rolling, and may be seamed or seamless.) Most of the body-penetrating gamma/X-ray photon radiation (that with photon energy>0.03 MeV) is transmitted through 1/16" of aluminum. Thus, aluminum tubing with ~1/16" thick wall provides good shielding from ambient light, good transmission of life-threatening radio-nuclide photon radiation for measurement, and a robust enclosure.

Disposed and supported (or mounted) within the rigid tube 30 is a substantially straight scintillating fiber (SF) 60.

The scintillating fiber 60 (for example, Bicron BCF-10 or BCF-12) is, in the preferred embodiment of FIGS. 1, 2, and 2a, a 5 mm (or approximately 5 mm) square cross-section polymer (or plastic) fiber that extends substantially the entire length between an active or sensing portion or face 20a of the PMT 20 and the light-proof cover 50. (Either round or square cross-section scintillating fibers may be used, but square is preferable because it has a higher efficiency for light-piping.) A useful property of a polymer scintillating fiber is that of having a density and radiation absorption similar to the human body. This similarity is important for the detection of life-threatening radiation. Additionally, in the preferred embodiment of FIGS. 1, 2, and 2a, the scintillating fiber 60 is a commercially available "multiclad" (or multi-coated) fiber for improved light-piping. (In a multiclad BCF-10 fiber, a PMMA cladding with an index of refraction n=1.49 surrounds a polystyrene-based fiber core with n=1.60, and a second layer of cladding with a lower index of refraction than PMMA surrounds the PMMA cladding.) However, in other embodiments of the invention, other scintillating fibers (such as single clad round or square BCF-10 fibers) having other diameters or cross-sections may be employed. (Preferably, the cross-sectional dimension of the scintillating fiber 60 is between about 2.5 mm and about 5 mm, with 5 mm presently being most preferred.) As shown in FIG. 2, the longitudinal axis 60a of the scintillating fiber 60 extends in a direction away from the active portion or face 20a of the PMT, and has a length which generally matches the length of the rigid tube 30; that is, the length of the scintillating fiber is between about or substantially 8 inches (or greater than 8 inches) and about 10 feet, and a cross-sectional dimension, or an average cross-sectional dimension, of the scintillating fiber is chosen to be not more than 1/40th of the length. (As used herein, the word "fiber" indicates a three-dimensional structure which is long in one dimension and slender or thin in each of its other two perpendicular dimensions. Structures which have two major dimensions that are equal and one minor dimension which is smaller than the major dimensions are not considered fibers. Additionally, structures having two unequal major dimensions that are both greater than 10 mm and one minor dimension which is smaller than both of the major dimensions are not considered fibers.)

The manner in which the scintillating fiber 60 is disposed and supported within the rigid tube 30 will now be particularly described with reference to FIGS. 2, 2a, 3a, and 3b. An adapter plate 70 is provided to optically couple and hold a first end 62 of the scintillating fiber 60 to the active face 20a of the PMT 20. (The active or sensing portion or face 20a of the PMT 20, in one embodiment, has a circular light input area with an 8 mm diameter.) The adapter plate 70 is similar in function, structure, and application to the optical fiber adapter 18 disclosed in the aforementioned allowed U.S. patent application (incorporated by reference herein) and comprises a square plate (e.g. made from metal) with a 5 mm square hole 72 at its center for snugly receiving the peripheral surface of the first end 62 of the scintillating fiber 60. The adapter plate 70 further comprises four screw holes 74 for permitting the adapter plate to be fastened to the first end 20f of the PMT 20 (which itself comprises four tapped holes in corresponding locations, not shown) by means of four screws (not shown) in such a manner that the surface of the first end 62 of the scintillating fiber 60 closely confronts or abuts the active face 20a of the PMT. The outer periphery of the adapter plate 70 is sized to fit within (or alternately abut flush against) the first end 32 of the rigid tube 30.

The portion of the scintillating fiber 60 which extends rightwardly of the adapter plate 70 in FIG. 2 is surrounded by a 0.5" O.D. Lucite (or other plastic material) tube 80. The Lucite tube 80 is somewhat rigid (having a wall thickness of 1/16") and prevents the long scintillating fiber from sagging excessively between the PMT 20 and the light-proof cover 50. The Lucite tube is supported within the rigid tube 30 at two or more locations along its length (e.g. at its middle, and near the end opposite the PMT) by means of foam-like or rigid supporting members 90. The supporting members 90 have peripheries (square or otherwise) sized to slide within the rigid tube and each of the supporting members 90 defines a central circular opening for receiving the Lucite tube 80. The supporting members 90 are preferably adhered or secured to the Lucite tube to facilitate assembly of the scintillating fiber radiation detector for homeland security. For example, the supporting members may each comprise adhesive foam tape which is wrapped around the Lucite tube 80 for a number of turns.

The manner in which the scintillating fiber radiation detector for homeland security is assembled will now be particularly described. Initially, the adapter plate 70 is attached to the front face of the PMT 20 by means of the four screws, and the scintillating fiber 60 is inserted into the Lucite tube 80. The supporting members 90 can then be attached to the outer peripheral surface of the Lucite tube 80. Subsequently, the first end 62 of the scintillating fiber 60 can be manipulated so that it is positioned within the hole 72 (FIG. 3a) of the adapter plate (in proper position for optical coupling to the PMT 20), and the rigid tube 30 can be assembled over the supporting members 90 and the Lucite tube 80 and the scintillating fiber 60.

The final assembly steps involve connecting the PMT 20 to the rigid tube 30 (for example, by inserting the PMT 20 slightly into the first end 32 of the rigid tube 30) and then light-proofing the device to shield the scintillating fiber from ambient light. The light-proof connection 40 between the PMT 20 and the rigid tube 30 is made, for example, by wrapping the joint between the PMT 20 and the rigid tube 30 with separate layers of aluminum foil and tape. Specifically, the joint between the PMT 20 and the rigid tube 30 is first surrounded by a strip of aluminum foil and then overlapping convolutions of black or opaque electrical, duct, or plastic tape are applied around the aluminum foil covered joint and the adjacent areas of the PMT 20 and the rigid tube 30 (i.e. so as to completely cover the joint between the PMT 20 and the rigid tube 30 and mechanically connect the PMT 20 and the rigid tube 30). The aluminum foil under the electrical tape ensures that all ambient light will be effectively excluded from entering the joint. In addition, other fastening means, such as glue, adhesives, or mechanical fasteners can be used to supplement the mechanical connection created by the wrappings of tape to ensure that the PMT 20 is mounted to the rigid tube 30 in a substantially relatively immovable manner.

Lastly, the light-proof cover 50 is provided over the second end 34 of the rigid tube 30. In one embodiment, the cover 50 is made by sequential layers of aluminum foil and electrical tape which cover the opening in the second end 34 of the rigid tube 30 (with the electrical tape holding the cover in place). In another embodiment a separate opaque cover piece or cap (made e.g. from plastic or aluminum) is fitted over the second end 34 of the rigid tube 30, and then the joint between the cover piece and the rigid tube 30 is light-proofed by means of tape and aluminum foil, as described above.

As shown in FIG. 1, an electrical or electronic module or system 100 (which is or can be made part of the scintillating fiber radiation detector for homeland security 10) is connected to the PMT 20 by means of a number of electrical lines. In particular, the PMT includes power lines 20p for receiving DC power from batteries 102, and signal lines 20s for outputting electrical voltage signals to an input section 104 of the electrical or electronic module or system. The input section 104 conditions or filters the signal produced by the PMT 20 and feeds it to an output section 106. The output section 106 drives or includes a voltage-responsive alarm or signalling device which indicates when life-threatening radiation is present. The alarm or signalling device responds to the voltage magnitude of the conditioned or filtered signal fed from the input section 104.

In the simplest form, the output section 106 may comprise a portable voltage reading multimeter (the higher the voltage indicated by the multimeter, the higher the dose-rate absorbed by the scintillating fiber 60). In the preferred embodiment, however, the output circuitry comprises a voltage-to-frequency converter 106a which feeds a sound generating device 106b (such as a speaker) for producing an audible frequency with a pitch proportional to absorbed radiation dose-rate. In more advanced systems, the output section 106 alternately or additionally includes an analog-to-digital converter which receives the conditioned or filtered analog output signal of the PMT 20 and converts it to digital form for subsequent input to and processing in a digital signal processor (which may be embodied in a portable laptop or desktop computer, not shown), and the digital signal processor preferably includes software for viewing and storing the measurement results and also for activating signalling devices, alarms, and/or countermeasures.

The input section 104 of the electrical or electronic module or system 100 is shown in FIG. 4. The input section 104 preferably includes a low-pass filter such as an integrator input circuit (IIC) which is preferably interposed between the differential voltage signal outputs 20s of the PMT 20 and the analog-to-digital converter (ADC) of the output section 106 for filtering or smoothing high-frequency variations which may be included in the PMT output signal (e.g. due to solar radiation spikes). The IIC includes a resistance R (e.g. 15 kΩ) in one of the signal lines from the PMT to the ADC, and a capacitance C (e.g. 10 μF) downstream of the resistance R bridging the two signal lines from the PMT to the ADC. As will be understood, the IIC functions as a low-pass filter having a time constant $\tau=RC$ of between 1 ms and 0.4 seconds and a cutoff frequency (−3 dB) of $(2\pi RC)^{-1}$. (For the electrical component values indicated above, $\tau$ is 0.15 s.) A "95% response time" is given as $3\tau$ (e.g. 0.45 s for the electrical component values indicated above) and provides an indication of how fast the filtered signal will attain 95% of a step input value. This response time (as opposed to a response time based on $\tau$) will be used for the present description. It is presently preferred that the IIC provides a $3\tau$ system response time of between about 3 ms and about 1 second. (Response times slower than about 1 second are not preferred since they can lead to unacceptable delays in radiation screening.)

The manner in which the scintillating fiber radiation detector for homeland security 10 operates will now be described. When the scintillating fiber 60 is in the presence of a radiation source (for example a life threatening radiation source), scintillating light is generated in the scintillating fiber 60 in an amount (intensity) which is proportional to the dose-rate of radiation absorbed by the scintillating fiber. The light generated in the scintillating fiber 60 is piped through the scintillating fiber 60 and detected by the PMT 20. The PMT 20 produces a (differential) voltage output signal which is in accordance with and generally linearly related to the amount of (e.g. visible) light generated by the scintillating fiber 60. The output signal from the PMT 20 is then conditioned (e.g. smoothed) and filtered in the input section 104 of the electrical or electronic module or system 100 and sent to the output section 106 for activating e.g. a display or signalling devices, alarms, storage devices, and/or countermeasures.

Systems and methods of using the scintillating fiber radiation detector for homeland security 10 will now be described.

Referring now to FIG. 5, the scintillating fiber radiation detector for homeland security 10 as shown in FIGS. 1 to 4 can be used as part of a non-contact, no delay baggage or object inspection system 200. In the depicted embodiment, the radiation detector 10 is used to scan baggage (without regard to size or shape of the baggage) as it is unloaded from an airplane, but other applications are envisioned (e.g. scanning packages in a mail sorting facility).

The baggage inspection system 200 comprises a wheeled cart 202 (depicted only partially) that includes a moving belt 204 (or object travel path, powered by an electric motor, not shown) for transporting objects such as baggage e.g. from the cargo hold of an airplane. The wheeled cart 202 further includes a pair of vertical support structures 206 (one on each side of the belt, though only one is shown in FIG. 5). Each vertical support structure 206 is provided with a cradle-like hook 208 suspended by a flexible support 210 (such as a thin chain or rope). A scintillating fiber radiation detector for homeland security 10 is removably positioned laterally or transversely across the path of the belt 204, resting horizontally in the two cradle-like hooks 208 adjacent to and above the travel path of the baggage (the travel path being indicated by the arrow 212). That is, in FIG. 5, the longitudinal axis of the scintillating fiber 60 extends into and out of the plane of the FIG., and the cradle-like hooks 208 provide a floating support for the scintillating fiber radiation detector for homeland security 10 (i.e. the hooks will move away from the baggage travel path upon accidental contact with the baggage).

The PMT 20 of the scintillating fiber radiation detector for homeland security 10 is connected to an electrical or electronic module or system 100 (not shown) which includes a battery, input section, and output section (as described above). In this system, the time constant of the IIC in the input section 104 is designed to produce a 95% response time of 0.08 seconds ($\tau=0.027$ seconds), and the output section 106 includes a voltage-to-frequency converter which feeds a sound generating device (e.g. a speaker or horn) for producing an audible frequency or tone with a pitch proportional to radiation dose-rate absorbed by the scintillating fiber. The characteristics of the voltage to frequency converter (and the PMT gain) can be chosen so that the generated pitch increases from an audible pitch (e.g. relatively low in the audible frequency spectrum) through the audible spectrum and into the ultrasonic spectrum in the presence of a life-threatening radiation dose-rate emanating from baggage or other objects to be screened. This provides for an "eyes-free" radiation measurement system.

In the system of FIG. 5, two scintillating fiber radiation detectors for homeland security 10 can be positioned several feet apart along a single object travel path. This arrangement can be used to confirm a threat and to eliminate false-positive errors. Additionally, the scintillating fiber radiation detector for homeland security 10 can be placed below, rather than above, the moving belt. This alternate arrangement would protect the PMT 20 and scintillating fiber 60 from accidental contact with baggage.

Figure 6:
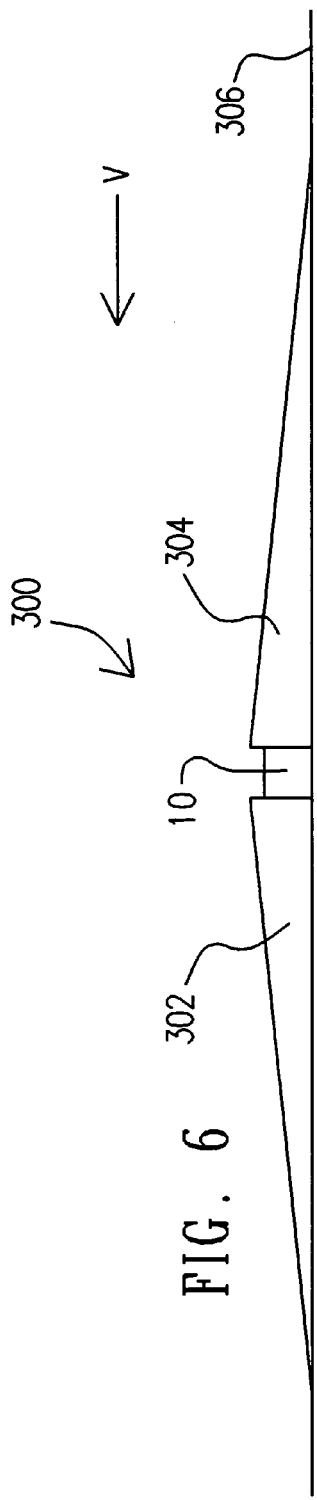
FIG. 6 is a side view of a system for scanning moving vehicles that utilizes the scintillating fiber radiation detector for homeland security shown in FIG. 1.
Figure 7:
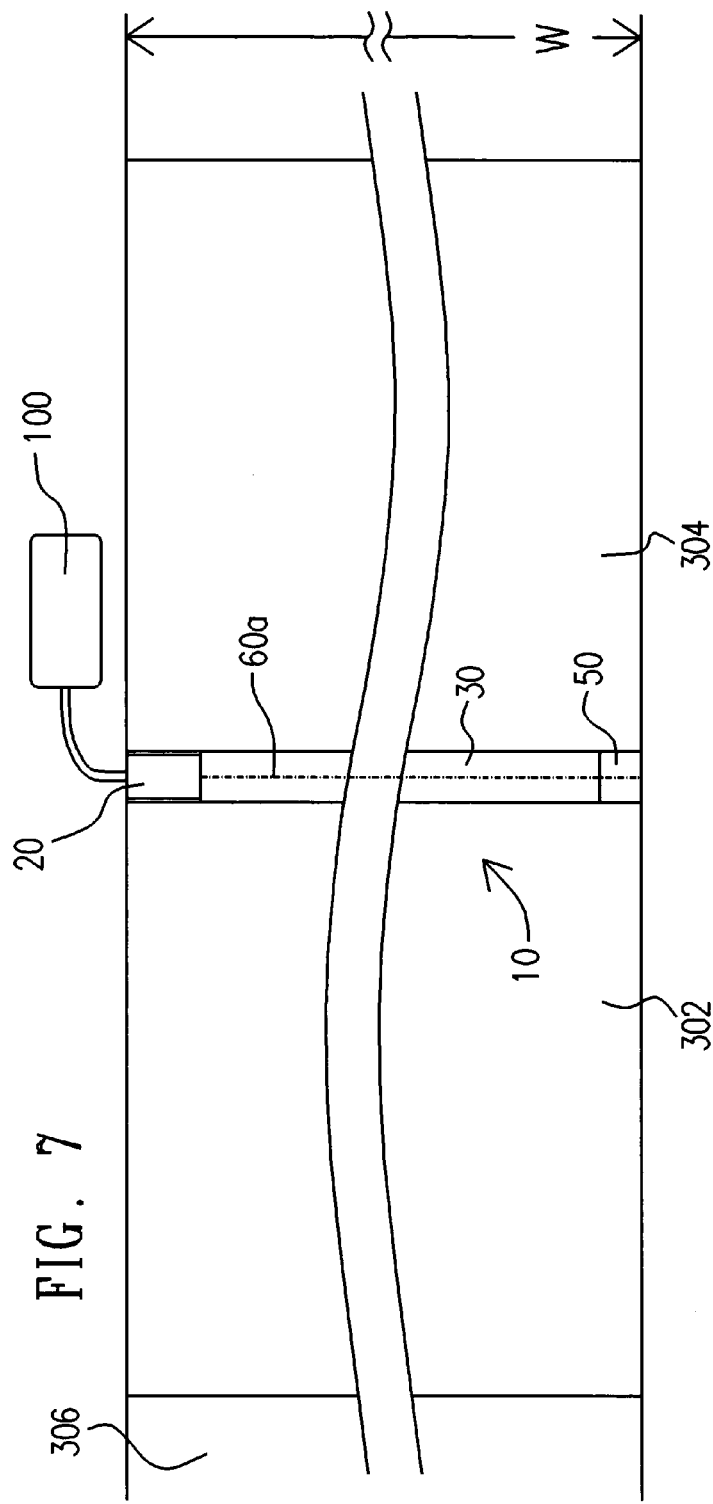
FIG. 7 is a top view of the system shown in FIG. 6.

Referring now to FIGS. 6 and 7, the scintillating fiber radiation detector for homeland security 10 as shown in FIGS. 1 to 4 can be used as part of a roadway inspection system 300 e.g. to be used at border inspection stations. The roadway inspection system 300 comprises leading and trailing ascending and descending ramps 302, 304 (made from metal or high-strength polymers) for travelling vehicles which can extend across the entire width W of the roadway. (The width W of the roadway signifies the width of the travel lane or lanes going in one direction, and the ramps 302, 304 together may function as a speed bump in the roadway, depending on their geometry.) The ramps 302, 304 each have a height of approximately 1½" and a length (perpendicular to the width W of the roadway) of between about 10" and about 30". The ramps 302, 304 are secured to the roadway 306 with a gap of approximately 1" between the highest points thereof. In the gap between the ramps 302, 304, a scintillating fiber radiation detector for homeland security 10 is disposed, with the PMT 20 positioned adjacent an edge of the roadway 306 and the longitudinal axis 60a of the scintillating fiber extending transversely to a direction of movement of vehicles on the roadway 306 (the direction being indicated by the arrow V in FIG. 6). The length of the rigid tube 30 (and scintillating fiber therein) is approximately equal to a width of the roadway W (e.g. to within several inches or a foot). The PMT 20 of the scintillating fiber radiation detector for homeland security 10 is connected to an electrical or electronic module or system 100 which includes a battery, input section, and output section (as described above). In this system, the time constant of the IIC in the input section 104 is designed to produce a 95% response time of 0.08 seconds ($\tau=0.027$ seconds).

Roadway inspection systems can also be configured without ramps by positioning the scintillating fiber radiation detector for homeland security 10 within transversely oriented grooves in the roadway. (The grooves should be 1½ deep to prevent contact between the scintillating fiber radiation detector for homeland security 10 and the tires of passing vehicles.) When these grooves are used, there is essentially no restriction on the speed of the passing vehicle for radiation detection. Vehicles travelling at speeds of 65 mph can be screened from ground level for radioactive content. (As used herein, the term "roadway" includes taxiways for planes at airports and travel paths for other wheeled vehicles, such as trains.)

Lastly, it is noted that two scintillating fiber radiation detector for homeland security 10 may be placed end-to-end in an assembly (e.g. light-proof cover to light-proof cover) with the PMTs 20 at the opposite ends of the assembly to provide a scintillating fiber radiation detector for homeland security with twice the sensing length (e.g. 12 feet) of a single detector. This type of dual-SF assembly avoids the portability problems associated with single detectors having lengths greater than about 6 or 10 feet, and can permit thinner scintillating fibers (which have shorter "1/e" attenuation lengths than thicker fibers; the 1/e attenuation length of a 5 mm square SF is about 15 feet for visible light) to be used more efficiently even where relatively long sensing lengths are needed. For example, dual-SF assemblies can be used in inspection systems for roadways with 12-foot wide lanes. Additionally, multiple-SF assemblies (with multiple detectors 10 aligned in head-to-tail orientations) may also be employed.

Figure 8:
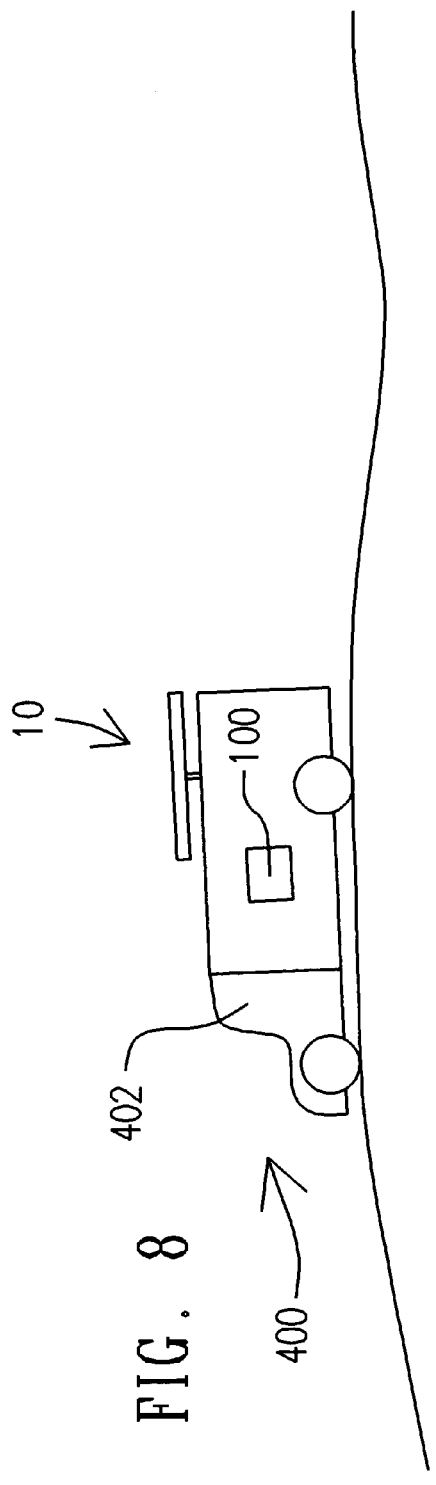
FIG. 8 is a side view of a system for radiation mapping that utilizes the scintillating fiber radiation detector for homeland security shown in FIG. 1.

While the embodiments of FIGS. 5 to 7 have revealed moving source, fixed detector systems, the scintillating fiber radiation detector for homeland security 10 can also be used in fixed source, moving detector systems. This application is particularly useful for providing spatial radiation mapping of a large area. FIG. 8 shows a system in which the scintillating fiber radiation detector for homeland security as shown in FIGS. 1 to 4 can be used as part of a radiation mapping system 400. A vehicle, such as a ground vehicle 402, is fitted with the scintillating fiber radiation detector for homeland security 10. (The detector can be housed within a thin-walled protective enclosure or the like disposed on the roof of the vehicle.) The vehicle travels or moves along paths which are known or discernable through available locating techniques (such as GPS) while collecting real-time radiation data. The longitudinal axis of the scintillating fiber 60 of the scintillating fiber radiation detector for homeland security 10 in this instance preferably (though not necessarily) extends in a direction substantially parallel to the vehicle travel path. The PMT 20 of the scintillating fiber radiation detector for homeland security 10 is connected to an electrical or electronic module or system 100 mounted in the vehicle which includes a battery, input section, and output section (as described above). In this system, the time constant of the IIC in the input section 104 is designed to produce a 95% response time of 0.8 seconds ($\tau$=0.27 seconds). The larger response time of this system accommodates delays in the updating of GPS data (e.g. updates every second) or other location data.

While the system of FIG. 8 has been described in relation to ground vehicles, it is also applicable e.g. to flying or low-flying vehicles.

Figure 9:
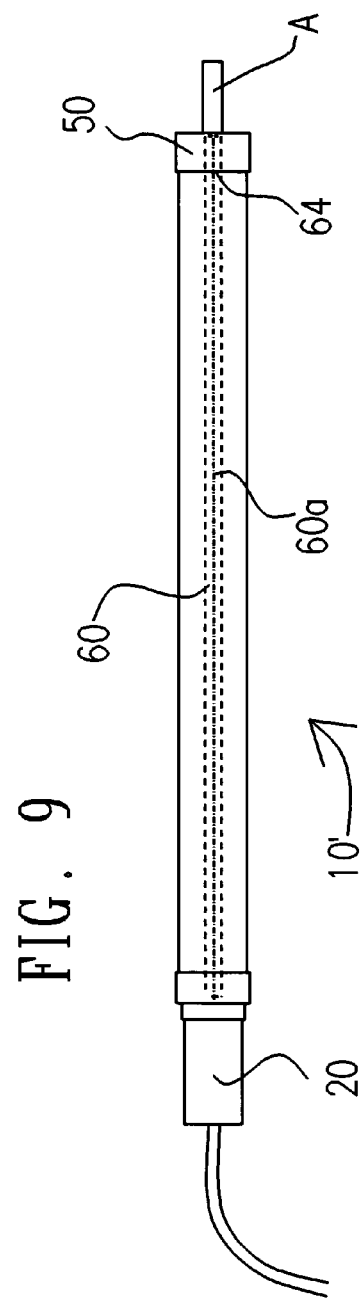
FIG. 9 is a top view of a scintillating fiber radiation detector for homeland security according to a modified form of the invention.

FIG. 9 reveals a modification of the scintillating fiber radiation detector for homeland security 10 shown in FIGS. 1 to 4. In this modification, an (axially extending) absorber A is positioned and mounted at the second end 64 of the scintillating fiber 60. Specifically, the scintillating fiber radiation detector for homeland security 10' is a hand-held portable unit and comprises a 1 foot long substantially straight scintillating fiber 60, and the absorber A comprises a brass rod, ¼" in diameter and one inch long. The axis of the brass rod is coaxial with the longitudinal axis 60a of the scintillating fiber 60, and the absorber A may be mounted on the light-proof cover or cap 50. The absorber A is especially useful in detectors 10' having scintillating fibers 20 that are about 1' or shorter in length (or about 300 mm or shorter in length, for example 100 mm), although the absorber A may also be used with detectors having longer scintillating fibers, as described above. Instead of brass, any radiation shielding or absorbing material whose average atomic mass is at least 63 (Cu) or whose average atomic number is at least 29 (Cu) may be used for the absorber A (for example, lead), and other shapes and sizes may be used as well. For example, the length in millimeters of the absorber A can be selected (e.g. conservatively) for a given material, using the relationship Absorber_Length[mm]$\geq$120/Specific_Gravity (though shorter absorber lengths can also function adequately in some cases). As for shape and size of the absorber A, no special requirements are necessary except that the cross-section of the absorber A is preferably about as large as (e.g. almost as large as or somewhat larger than) the cross-section of the scintillating fiber 60. For example, a square cross-section absorber (not shown) with a 5 mm cross-section (e.g. 5 mm on a side) could be used instead of the brass rod shown in FIG. 9. Preferably, the cross-section of the absorber A is not overly mismatched (e.g. by a factor of two or greater) with that of the scintillating fiber 60, although for close-range inspection systems even overly large absorbers (mismatched by a factor of five or greater) will provide some measure of adequate directionality. Most preferably, however, the cross-section of the absorber A substantially matches (e.g. +/–about 10%) that of the scintillating fiber 60 to achieve a high level of directionality.

(Except as noted above, the structure of the modified scintillating fiber radiation detector for homeland security 10' is identical to the structure of the scintillating fiber radiation detector for homeland security 10 shown in FIGS. 1 to 4, and for the sake of brevity, the details of that preferred embodiment are incorporated by reference into the modified embodiment. The absorber A does, however facilitate the use of scintillating fibers shorter than 8 inches in the detector.)

The modified scintillating fiber radiation detector for homeland security 10' shown in FIG. 9 is particularly adapted for directional and angular size measurements.

The direction and angular size of a radiation source can be found by sweeping the scintillating fiber radiation detector for homeland security 10' through space. A minimum signal occurs when the second end 64 of the scintillating fiber 60 (or the scintillating fiber axis 60a) is pointed toward the source (for example, within 5 degrees). The directional anisotropy of an SF radiation detector is primarily established when the ratio (physical length/radiation attenuation length) for the scintillating fiber is greater than unity (the 1/e radiation attenuation length of a 5 mm square SF is <1 foot for 1 MeV gamma rays). In the device of FIG. 9, the directional anisotropy is enhanced (and its angular width modified) by the absorber A, even in the case where the aforementioned ratio is less than unity. This directionality can be used to find or avoid the radiation source. Directional information can be a great asset in radiation detection, and can be very helpful to rescue personnel for guidance in finding and/or avoiding harmful radiation.

Of particular importance, the scintillating fiber radiation detector for homeland security 10' of FIG. 9 (which can be held in hand e.g. by grasping the casing of the PMT 20) allows the acquisition of magnitude information from a radiation source of unknown location even before the detector is aligned with the direction of the source. That is, the dose-rate (magnitude) of radiation from a radiation source which is non-aligned with the axis 60a of the scintillating fiber 60 is sensed/acquired/ascertained and indicated quickly (e.g. by sweeping the detector 10' through space, or otherwise holding it with its axis 60a non-aligned to the radiation source), and then a locating or alignment process is effected (by manipulating the scintillating fiber radiation detector for homeland security 10') to discern the direction of the source by seeking the minimum signal response from the detector 10'. Once the orientation of a minimum signal response from the detector 10' is found, the direction of the axis 60a will indicate generally or substantially the direction of (or to, or from) the radiation source. As such, there is no need to initiate a locating or alignment process unless a hazardous or potentially hazardous or suspect radiation dose-rate (magnitude) is first detected. This is in contrast to conventional prior art directional detectors which can only respond to radiation coming from the direction which they are pointing to, and which therefore must be properly aligned with a source before dose-rate (magnitude) information can be obtained.

Other features, advantages, and applications of the scintillating fiber radiation detector for homeland security 10 or 10' will now be described.

The SI unit of absorbed radiation Dose_Rate is Grays/second. 1 Gray (Gy) is the dose which imparts 1 Joule of ionizing (chemically altering) energy to 1 kilogram of matter.

The PMT voltage output is related to the average <Dose_Rate> over the SF sensor by the formula:

PMT_Voltage_Out[V]=<Dose_Rate>[Gray/sec]*Sensor_Volume[m^3]*Sensor_Density[kgm/m^3]*PMT_Gain[V/W]*Efficiency, where Sensor_Volume is the SF volume which absorbs the <Dose_Rate>, Sensor_Density is ~10^3[kgm/m^3] (for an SF, similar to human body), and PMT_Gain can be up to ~10^11 Volts-out/Watts-in. Efficiency gives the fraction of the SF absorbed radiation which is converted to measurable light at the PMT Input. Efficiency includes scintillation efficiency (radiation energy dependent), and losses from fiber light-piping, fiber attenuation, and PMT coupling (not radiation energy dependent). Efficiency for Cs-137 gamma rays is ~3*10^-3 for a 5 mm square, multi-coated, SF<9 feet long. Though its value is not needed for relative dosimetry, it can be obtained by calibration.

For a 6' SF/PMT according to one embodiment of the invention, the (SF length averaged) Dose_Rate and PMT_Out are related by:

<Dose_rate>[Gy/yr]~2*PMT_Out[V].

For the same 6' SF/PMT, the relation between safe radiation exposure for humans and PMT_Out is:

TIME LIMIT FOR SAFE RADIATION EXPOSURE [Yrs] ~1/(2*PMT_Out[V])

Life-threatening (or hazardous or potentially hazardous) radiation can be defined as Dose>1 Gy.

According to one embodiment of the invention with a 6' SF, the SF/PMT/ADC Signal/rmsNoise is ~20/1, Signal magnitude is ~50 mV, and Response Time is ~0.08 sec, for Dose_Rates of 0.1 Gy/yr (1.3 mR/hr). For statistical noise (i.e. the time randomness of the radiation coming from the source, which is the predominant noise component), the Signal/rmsNoise is proportional to the square root of [Dose_Rate*Sensor_Volume*AveragingTime], where AveragingTime is the 3τ Response Time. For measuring lower Dose_Rates with 'statistical' noise, an 0.8 sec Response Time should allow dosimetry to 10^-2 Gy/yr (0.13 mR/hr). The Signal/rmsNoise will be >20/1.

More generally speaking, for a SF of Length L[ft], the Dose_rate and PMT_Out are related by:

<Dose_rate>[Gy/yr]~(12/L)*PMT_Out[V]

This relation is limited by signal and background noise. As previously indicated, for statistical noise, the Signal/rmsNoise is proportional to SQRT [Dose_Rate*Sensor_Volume*AveragingTime], where AveragingTime is the 3τ Response Time. Therefore, in the case where it is necessary to increase the Signal to rmsNoise ratio for measuring low dose-rates, either the sensor volume (i.e. the volume of the scintillating fiber absorbing the dose-rate) or the averaging time can be increased. It is presently preferred to have a Signal to rmsNoise ratio of greater than 10 (for example, about 20).

Furthermore, for a SF of Length L[ft], the relation between safe radiation exposure for humans and PMT_Out is:

SAFE RADIATION EXPOSURE TIME [Yrs] ~L/(12*PMT_Out[V])

SAFE RADIATION EXPOSURE TIME is defined as when Dose <1 Gy. Thus, with a 2' SF, a SAFE RADIATION EXPOSURE TIME of 1 week will produce an 8.6 V PMT signal, easily flagged with an LED or other indicator. (According to a preferred embodiment of the invention, the SF/PMT allows the owner to set the radiation level which will be flagged.)

The radiation inspection time is preferably <1 second for each radiation measurement, to provide 'no-delay' measurement for baggage/package/cargo/vehicle radiation inspection. This measurement time would allow piggyback radiation inspection in moving systems or environments. As shown above, the scintillating fiber radiation detector for homeland security can operate under these important constraints. But more can be achieved. The measurement time of the scintillating fiber radiation detector for homeland security allows differentiating life-threatening signals from fast (false-positive) signals. Solar pulses are the dominant source of fast (false-positive) signals. Using the linear absorbed-dose-rate response of a SF/PMT radiation detector in combination with its wide dynamic range, the scintillating fiber radiation detector for homeland security is capable of detecting a level of radiation which would be below the level of human life-threat, while integrating fast, non-threatening (e.g., solar) radiation spikes into the background signal.

To remove fast, false-positive signals in this manner, the SF/PMT response time must lie between the longest false-positive signal time and the desired response time. From measurements, the former time range is taken to be ~1 msec (e.g. for solar radiation). The latter time range is ~1 second. Therefore the response time of the integrator circuit is selected to be between about 3 ms and about 1 second to eliminate false-positive signals. This response time can be made to be selectable (e.g. with a switch) in the preferred embodiment of the invention.

A shortcoming of commonly used visible alarm indicators (e.g., meter or light) is that they require a person to constantly monitor the alarm state with his/her eyes. Converting detector voltage to sound frequency allows a convenient, eyes-free, and quantitative audio-detection of a radiation threat. This allows a fast, simple location of a trouble-item. The frequency also gives an estimate of the magnitude of the radiation. Eyes-free radiation detection and threat estimation can be used in many cases. (However, a multimeter can also be used for a final indication, when eyes-free detection is not needed.)

To provide audio detection of a radiation threat, the voltage output of the PMT 20 is fed to a voltage-to-frequency converter to provide an audible frequency, with pitch proportional to the dose-rate. This method can be sensitive: a piano 'half-tone' (6% frequency change from a 'black' key to the nearest 'white' key) can be easily discerned as a relative pitch change by the human ear. As the radiation-emanating baggage passes under/over the SF, the pitch will increase, then decrease. Only the change in pitch with time is used for radiation detection, an easily heard, unique time/magnitude signature, that avoids most false-positive alerts. The rising & falling pitch will locate the threatening baggage on the belt or carrier. The maximum pitch (frequency) change will establish the magnitude of the radiation threat. Eyes need not be moved from normal baggage loading/unloading tasks, and no change in procedure is necessary, unless there is a radiation threat, such as to Homeland Security.

Fast (0.08 sec) detection of radiation in letters at postal processing rates (30,000 letters/hour) is possible with the scintillating fiber radiation detector for homeland security 10. Additionally, fast (0.08 sec) detection of in-envelope, uncommon elements in chemical and biological threatening compounds by fast nuclear spectroscopy (30,000 envelope measurements/hour), may then be possible.

Helicopter dosimetry of ground radiation may be possible.

A roof-mounted SF/PMT on a vehicle can yield fast radiation dosimetry. Vehicles going at 50 mph can provide 6' spatial resolution (0.08 seconds time resolution) for radiation detection. High spatial resolution is useful for radiation detection through rubble holes and down intersecting streets and alleys.

Airplane radiation mapping of the earth's surface, is possible. Slow (0.8 sec) detection of radiation allows mapping at Dose_Rates ~$10^2$ Gy/yr (0.13 mR/hr). Spatial resolution can be calculated.

GPS radiation mapping is also possible. This does not require a fixed/known speed or route. Radiation and location data can even be automatically radioed to control locations for instant mapping.

As used herein, "thin-walled" signifies a wall thickness which provides for transmission of a substantial percentage of life-threatening radio-nuclide photon radiation through the wall. As used herein in connection with the rigid tube 30, "tube" signifies a hollow structural member or assembly with an elongate internal cavity and at least one open end.

While the invention has been described with certain particularity, it is not meant to be limited to the above described preferred embodiments. For example, other cross-sections and diameters for the tube 30 (such as circular, triangular, or rectangular) may be employed, and other opaque materials (such as plastics) may be used for the tube 30. Other substantially rigid structures or enclosures (such as clam-shell envelopes or hollow machined housings) may be used in place of the one-piece thin-walled tube 30. The Lucite tube 80 may be omitted, and other means (e.g. supports) may be used if needed to protect the scintillating fiber from excessive sagging or bending. An extra-mural absorber may be applied to the cylindrical outer surface of the scintillating fiber. The scintillating fiber radiation detector for homeland security can be easily combined with a commonly used battery-operated, hand-held, metal detector. Additional thin-walled outer casings and/or handles (e.g. other than the PMT casing itself) for improved portability can be provided for the scintillating fiber radiation detector for homeland security. The scintillating fiber radiation detector for homeland security may be a hand-held wand in which the electrical or electronic control module or system 100 is mounted directly on the PMT 20 or the rigid tube 30. Roadway inspection systems can be arranged so that the scintillating fiber radiation detector for homeland security 10 is disposed to the side of or above (rather than below) the vehicle travel path. Therefore, the invention will encompass the preferred embodiments described above as well as any modifications thereof which will fall within the scope of the appended claims.

I claim:

1. A radiation detector for homeland security comprising:
   a substantially rigid opaque tube;
   a scintillating fiber mounted and supported within the substantially rigid opaque tube, the scintillating fiber having a first end and a second end; the scintillating fiber having a length of between about 8 inches and about 10 feet;
   a light intensity measuring device mounted to the substantially rigid opaque tube in a substantially relatively immovable manner;
   coupling means for optically coupling the first end of the scintillating fiber to an active portion of the light intensity measuring device;
   means for shielding the scintillating fiber from ambient light;
   wherein the light intensity measuring device produces an output signal in accordance with an amount of light generated by the scintillating fiber;
   wherein the light intensity measuring device comprises a battery-powered photomultiplier tube attached to a first end of the substantially rigid opaque tube by a light-proof connection, wherein the coupling means comprises an adapter plate attached to the battery-powered photomultiplier tube and fitted within the first end of the substantially rigid opaque tube, wherein a light-proof cover is provided at a second end of the substantially rigid opaque tube, and wherein the scintillating fiber is enclosed entirely within the substantially rigid opaque tube between the battery-powered photomultiplier tube and the light-proof cover.

2. The radiation detector as recited in claim 1, wherein the output signal from the light intensity measuring device is fed through an integrator circuit, which filters high frequency variations that may be included in the output signal of the light intensity measuring device, to an analog-to-digital converter for subsequent input to a digital signal processor.

3. The radiation detector as recited in claim 2, wherein a response time of the integrator circuit is between about 3 ms and about 1 second.

4. A system comprising the radiation detector as recited in claim 1, wherein the radiation detector is mounted to a support structure adjacent to an object travel path in such a manner that the longitudinal axis of the scintillating fiber extends transversely to a direction of movement of objects along the travel path.

5. A system comprising the radiation detector as recited in claim 1, wherein the radiation detector is mounted to a roadway between leading and trailing ramps in such a manner that the longitudinal axis of the scintillating fiber extends transversely to a direction of movement of vehicles on the roadway.

6. The system as recited in claim 5, wherein a length of the scintillating fiber is approximately equal to a width of the roadway.

7. A system comprising the radiation detector as recited in claim 1, wherein the radiation detector is mounted to a moving vehicle for providing spatial radiation mapping of a large area.

8. The radiation detector as recited in claim 1, wherein the output signal from the light intensity measuring device is fed through a circuit which filters high frequency variations that may be included in the output signal of the light intensity measuring device.

9. The radiation detector as recited in claim 8, wherein the circuit comprises an RC low-pass filter circuit.

10. The radiation detector as recited in claim 9, wherein an RC time constant of the circuit is between about 0.001 sec and 0.4 seconds for minimizing any effects of solar radiation spikes.

11. The radiation detector as recited in claim 8, wherein the integrator circuit provides a system response time of between about 3 ms and about 1 second.

12. The radiation detector as recited in claim 1, wherein the output signal from the light intensity measuring device is fed through an integrator circuit, which filters high frequency variations that may be included in the output signal of the light intensity measuring device, to a voltage-to-frequency converter and then to a sound generating device for producing an audible frequency with a pitch proportional to absorbed radiation dose-rate.

13. The radiation detector for homeland security as recited in claim 1, wherein the scintillating fiber extends substantially an entire length between the active portion of the light-intensity measuring device and the light-proof cover.

14. A radiation detector for homeland security comprising:
  a substantially rigid tube;
  a scintillating fiber mounted to the substantially rigid tube, the scintillating fiber having a first end and a second end; the scintillating fiber having a length of between about 8 inches and about 10 feet;
  a light intensity measuring device mounted to the substantially rigid tube in a substantially relatively immovable manner;
  coupling means for optically coupling the first end of the scintillating fiber to an active portion of the light intensity measuring device;
  means for shielding the scintillating fiber from ambient light;
  wherein the light intensity measuring device produces an output signal in accordance with an amount of light generated by the scintillating fiber;
  wherein a cross-sectional dimension of the scintillating fiber is approximately 5 mm and a longitudinal axis of the scintillating fiber extends in a direction away from the active portion of the light intensity measuring device; and
  wherein the output signal from the light intensity measuring device is fed through an integrator circuit, which filters high frequency variations that may be included in the output signal of the light intensity measuring device, and to an analog-to-digital converter for subsequent input to a digital signal processor.

15. The radiation detector as recited in claim 14, wherein the substantially rigid tube comprises a substantially rigid opaque tube, and wherein the scintillating fiber is disposed inside the opaque tube.

16. The radiation detector as recited in claim 15, wherein the opaque tube comprises a thin-walled aluminum tube.

17. The radiation detector as recited in claim 15, wherein the opaque tube has a rectangular cross-section.

18. The radiation detector as recited in claim 15, further comprising a substantially rigid support tube disposed and supported within the opaque tube, wherein the scintillating fiber is disposed within the support tube.

19. The radiation detector as recited in claim 15, wherein the light intensity measuring device comprises a photomultiplier tube attached to a first end of the substantially rigid opaque tube by a light-proof connection.

20. The radiation detector as recited in claim 19, wherein the scintillating fiber is at least about 3 feet long.

21. The radiation detector as recited in claim 14, wherein the integrator circuit provides a system response time of between about 3 ms and about 1 second.

22. The radiation detector as recited in claim 14, wherein the integrator circuit provides a system response time of about 0.08 seconds.

23. The radiation detector as recited in claim 14, wherein the integrator circuit provides a system response time of about 0.8 seconds.

24. The radiation detector as recited in claim 14, wherein the integrator circuit comprises an RC circuit having an RC time constant of between about 0.001 seconds and about 0.4 seconds for minimizing any effects of solar radiation spikes.

25. The radiation detector for homeland security as recited in claim 14, wherein the light intensity measuring device is attached to a first end of the substantially rigid tube, a light-proof cover is provided at a second end of the substantially rigid tube, and wherein the scintillating fiber is enclosed entirely within the substantially rigid tube between the light intensity measuring device and the light-proof cover.

26. The radiation detector for homeland security as recited in claim 25, wherein the scintillating fiber extends substantially an entire length between the active portion of the light-intensity measuring device and the light-proof cover.

27. The radiation detector for homeland security as recited in claim 19, wherein the photomultiplier tube comprises a battery-powered photomultiplier tube.

28. A radiation detector for homeland security comprising:
  a substantially rigid structure;
  a scintillating fiber mounted to the substantially rigid structure, the scintillating fiber having a first end and a second end; the scintillating fiber having a length of between about 8 inches and about 10 feet;
  a light intensity measuring device mounted to the substantially rigid structure in a substantially relatively immovable manner;
  coupling means for optically coupling the first end of the scintillating fiber to an active portion of the light intensity measuring device;
  means for shielding the scintillating fiber from ambient light;
  wherein the light intensity measuring device produces an output signal in accordance with an amount of light generated by the scintillating fiber;
  wherein the substantially rigid structure comprises a substantially rigid opaque tube, and wherein the scintillating fiber is disposed inside the opaque tube, with a longitudinal axis of the scintillating fiber extending in a direction away from the active portion of the light intensity measuring device; and
  wherein the output signal from the light intensity measuring device is fed through a low-pass filter which filters high frequency variations that may be included in the output signal of the light intensity measuring device, and to an analog-to-digital converter for subsequent input to a digital signal processor.

29. The radiation detector as recited in claim 28, wherein the opaque tube comprises a thin-walled aluminum tube.

30. The radiation detector as recited in claim 28, wherein the opaque tube has a rectangular cross-section.

31. The radiation detector as recited in claim 28, wherein the light intensity measuring device comprises a photomultiplier tube attached to a first end of the opaque tube by a light-proof connection.

32. The radiation detector as recited in claim 31, wherein the scintillating fiber is at least about 6 feet long.

33. The radiation detector as recited in claim 28, further comprising a substantially rigid support tube disposed and supported within the opaque tube, wherein the scintillating fiber is disposed within the support tube.

34. The radiation detector for homeland security as recited in claim 28, wherein the light intensity measuring device is attached to a first end of the substantially rigid opaque tube, a light-proof cover is provided at a second end of the substantially rigid opaque tube, and wherein the scintillating fiber is enclosed entirely within the substantially rigid opaque tube between the light intensity measuring device and the light-proof cover.

35. The radiation detector for homeland security as recited in claim 34, wherein the scintillating fiber extends substantially an entire length between the active portion of the light-intensity measuring device and the light-proof cover.

36. The radiation detector for homeland security as recited in claim 28, wherein the light intensity measuring device is a battery-powered photomultiplier tube, wherein the coupling means comprises an adapter plate attached to the battery-powered photomultiplier tube and fitted within the first end of the substantially rigid opaque tube.

37. A radiation detector for homeland security comprising:
  a substantially rigid structure;
  a scintillating fiber mounted within the substantially rigid structure, the scintillating fiber having a first end and a second end, a length greater than 8 inches and less than about 10 feet, and a cross-sectional dimension of at least 2.5 mm;
  a light intensity measuring device mounted to the substantially rigid structure in a substantially relatively immovable manner;
  coupling means for optically coupling the first end of the scintillating fiber to an active portion of the light intensity measuring device;
  means for shielding the scintillating fiber from ambient light;
  wherein the light intensity measuring device produces an output signal in accordance with an amount of light generated by the scintillating fiber; and
  wherein the output signal from the light intensity measuring device is fed through a low-pass filter which filters high frequency variations that may be included in the output signal of the light intensity measuring device, and to an analog-to-digital converter for subsequent input to a digital signal processor.

38. The radiation detector as recited in claim 37, wherein a response time of the low-pass filter is between about 3 ms and about 1 second.

39. The radiation detector for homeland security as recited in claim 37, wherein the light intensity measuring device comprises a battery-powered photomultiplier tube.

* * * * *